(12) United States Patent
Limbasia et al.

(10) Patent No.: US 8,635,270 B2
(45) Date of Patent: Jan. 21, 2014

(54) THREAD MECHANISM FOR MEDIA AND METADATA UPLOAD

(75) Inventors: Sunil Limbasia, Irving, TX (US);
Abhilash Paul, Irving, TX (US);
Aravind Perumandla, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 173 days.

(21) Appl. No.: 13/235,868

(22) Filed: Sep. 19, 2011

(65) Prior Publication Data

US 2013/0073688 A1 Mar. 21, 2013

(51) Int. Cl.
*G06F 15/16* (2006.01)

(52) U.S. Cl.
USPC .......................................... 709/203; 709/219

(58) Field of Classification Search
USPC .................................. 709/219, 203
See application file for complete search history.

(56) References Cited

U.S. PATENT DOCUMENTS

| | | | |
|---|---|---|---|
| 6,119,118 A * | 9/2000 | Kain et al. ..................... 707/822 |
| 6,385,644 B1 * | 5/2002 | Devine et al. ................. 709/206 |
| 7,836,508 B2 * | 11/2010 | Gumpel et al. ................. 726/26 |
| 2004/0236785 A1 * | 11/2004 | Greiner ...................... 707/104.1 |
| 2005/0198305 A1 * | 9/2005 | Pezaris et al. ................. 709/227 |
| 2005/0237326 A1 * | 10/2005 | Kuhne .......................... 345/506 |
| 2006/0136472 A1 * | 6/2006 | Jujjuri et al. .................. 707/102 |
| 2007/0294499 A1 * | 12/2007 | Garthwaite ................... 711/170 |
| 2008/0172392 A1 * | 7/2008 | Crichton et al. ................ 707/10 |
| 2009/0055399 A1 * | 2/2009 | Lu et al. ........................... 707/10 |
| 2009/0064155 A1 * | 3/2009 | Giuli et al. .................... 718/103 |
| 2009/0094652 A1 * | 4/2009 | Al Adham et al. ............ 725/103 |
| 2009/0219827 A1 * | 9/2009 | Chen et al. .................... 370/252 |
| 2011/0119327 A1 * | 5/2011 | Masuda .......................... 709/203 |
| 2011/0167358 A1 * | 7/2011 | Robillard et al. .............. 715/753 |
| 2012/0089706 A1 * | 4/2012 | Collins et al. ................. 709/219 |
| 2012/0154310 A1 * | 6/2012 | Denny et al. .................. 345/173 |

* cited by examiner

*Primary Examiner* — Waseem Ashraf

(57) ABSTRACT

A device receives media objects and metadata associated with the media objects, and utilizes a portion of threads to upload, to a first server, metadata for a portion of the received media objects. The device also utilizes, after the metadata for the portion of the media objects is uploaded, a remaining portion of the threads to upload, to the first server, metadata for a remaining portion of the media objects. The device further utilizes a first thread and a second thread to upload a first two media objects to a second server after the metadata for the remaining portion of the media objects is uploaded, and utilizes, after the first two media objects are uploaded, a third thread and a fourth thread to upload a next two media objects to the second server.

20 Claims, 8 Drawing Sheets

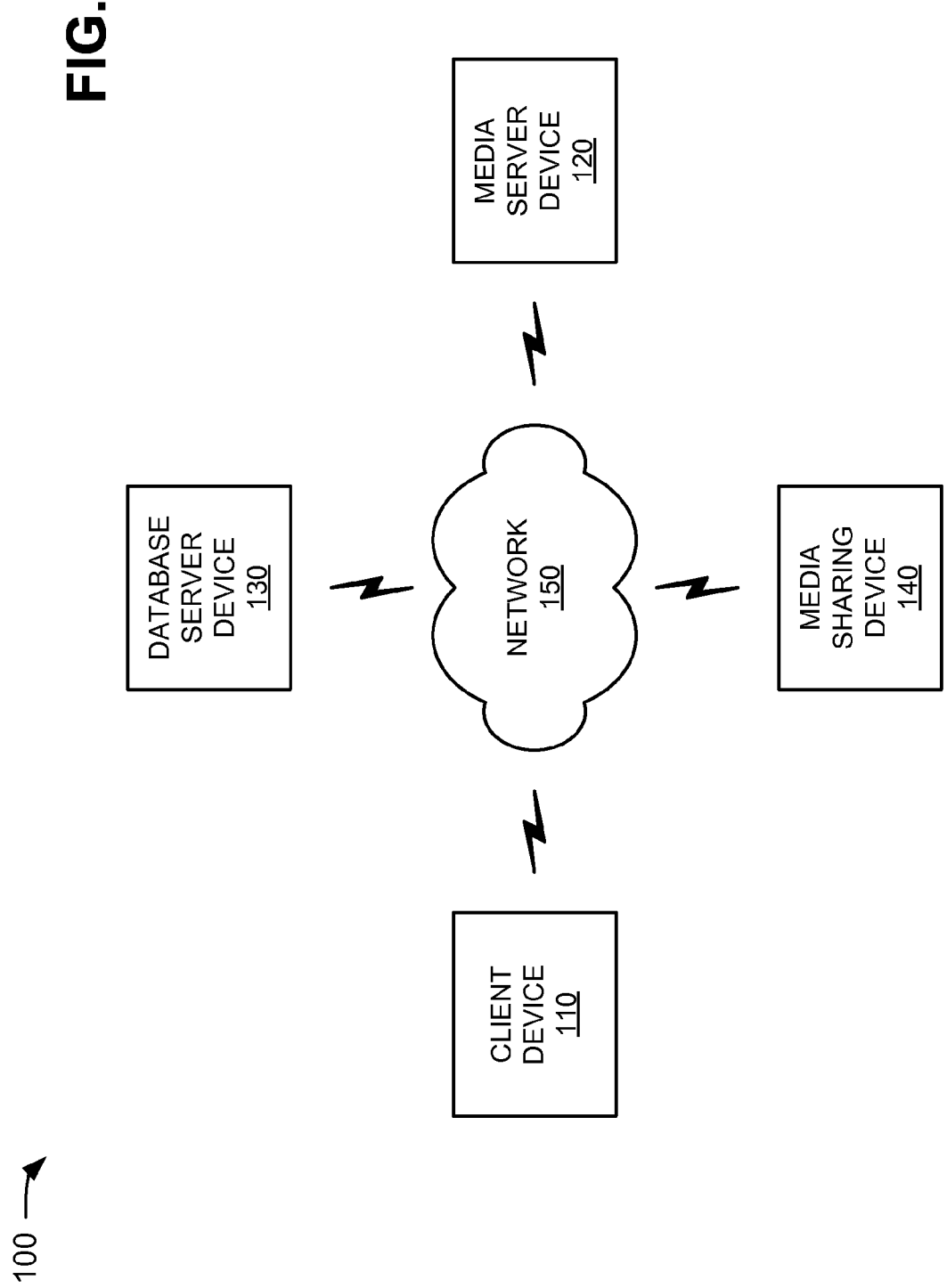

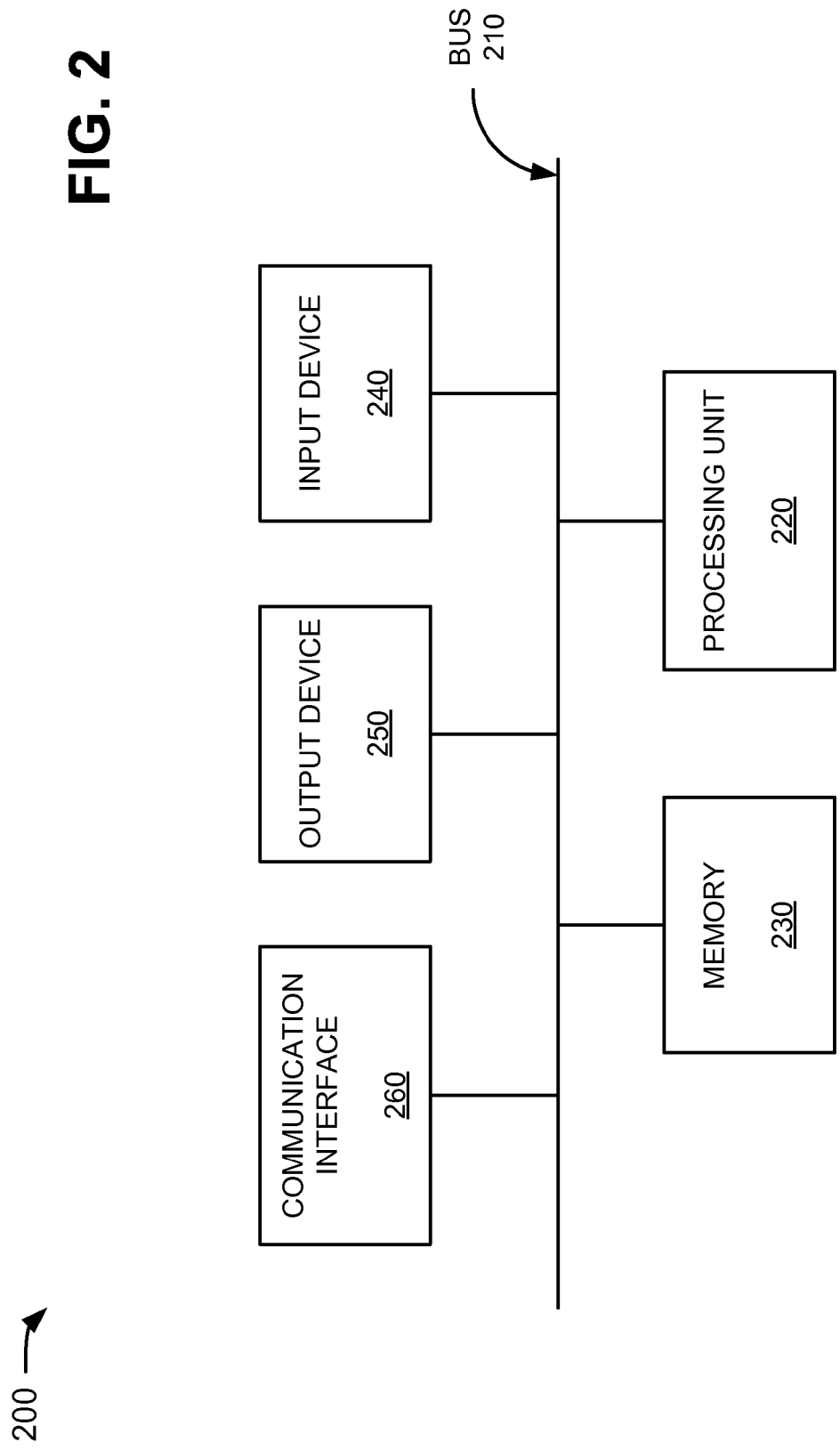

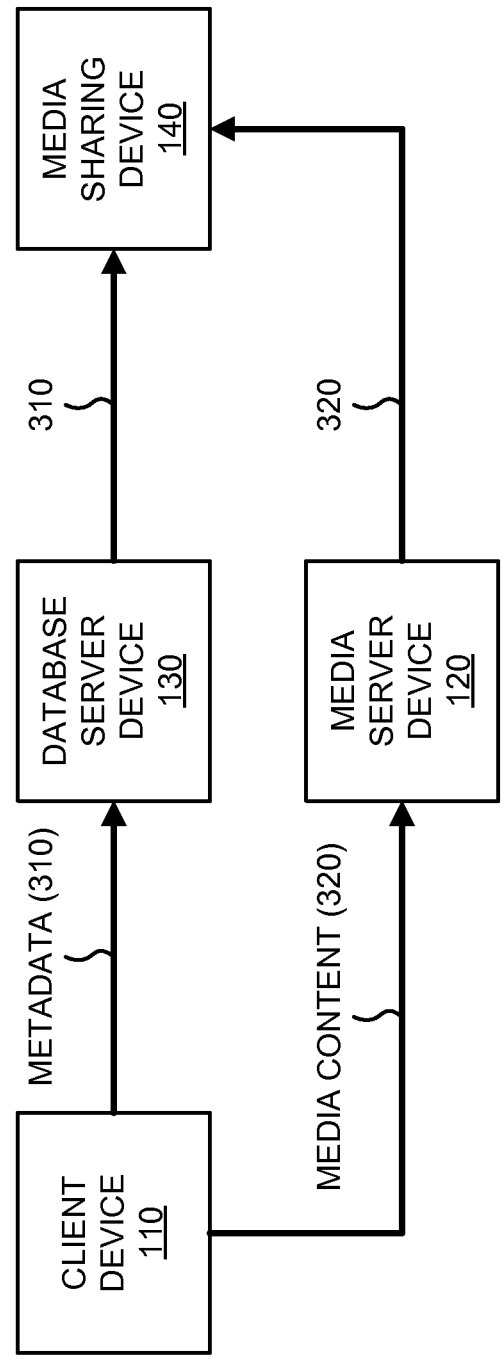

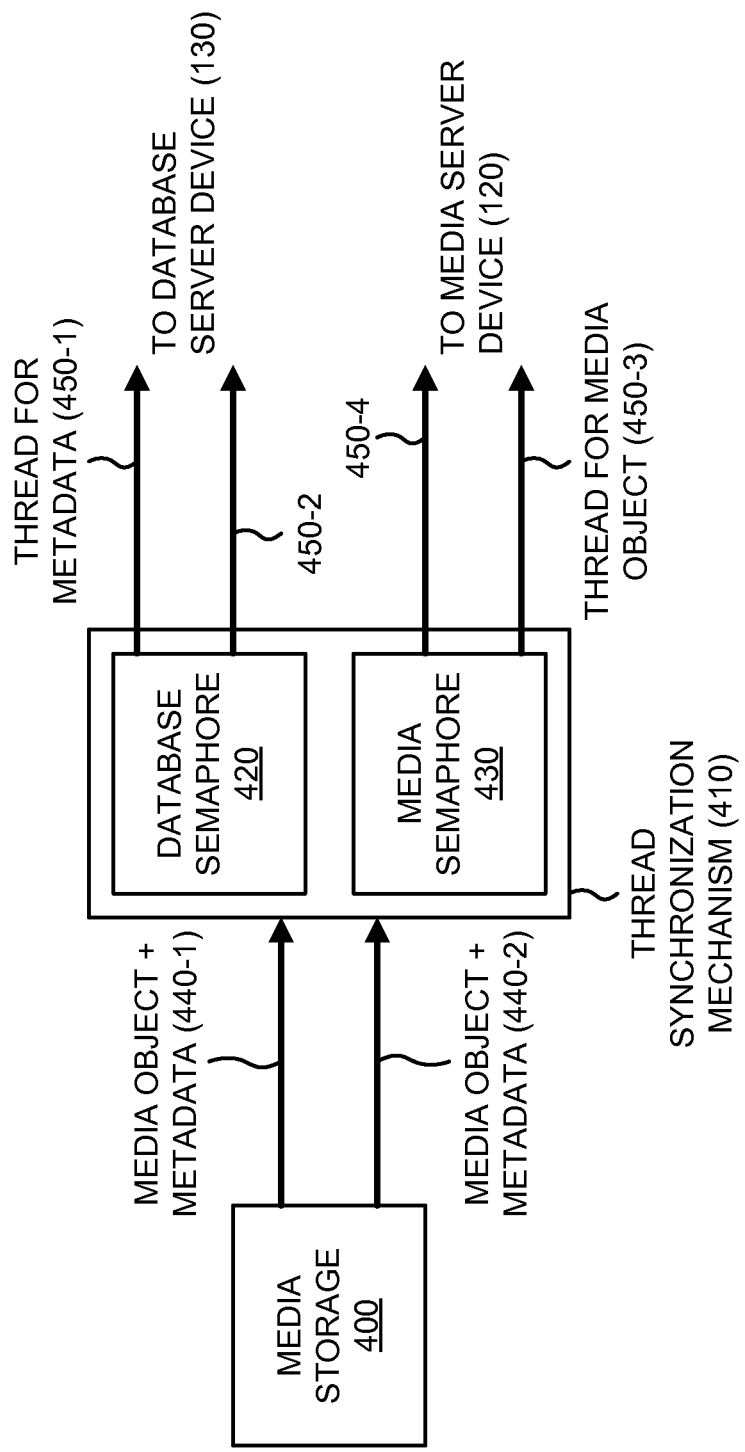

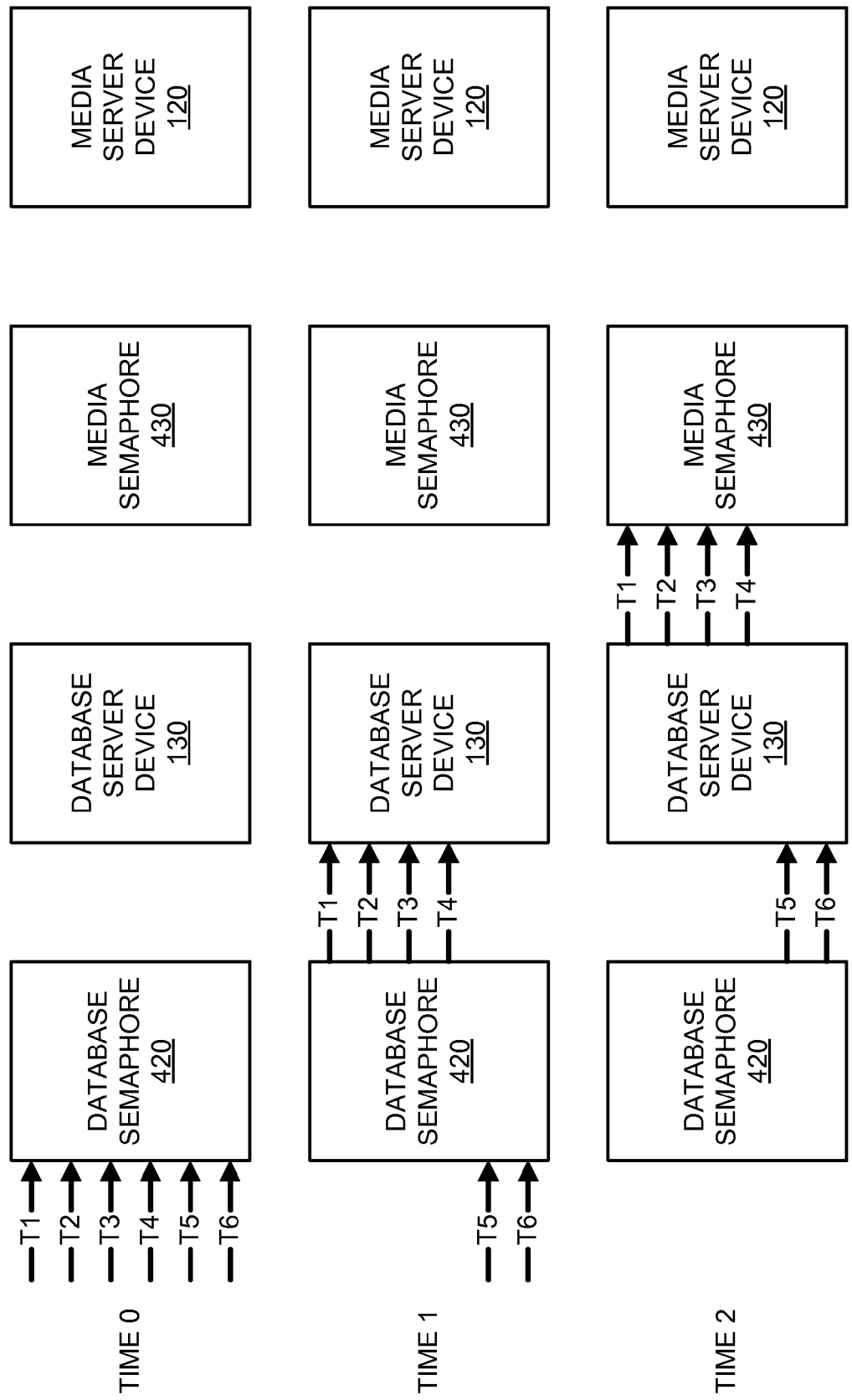

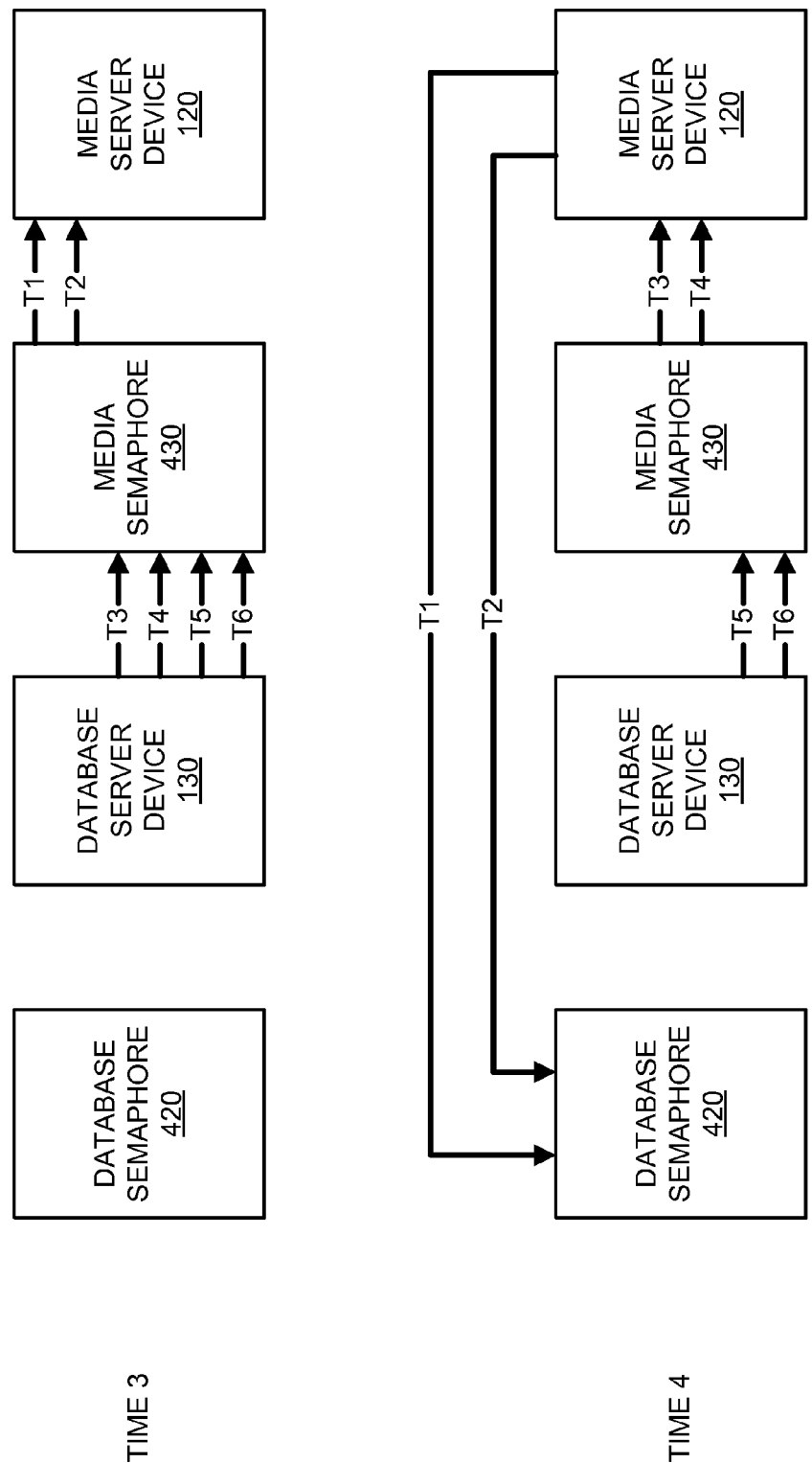

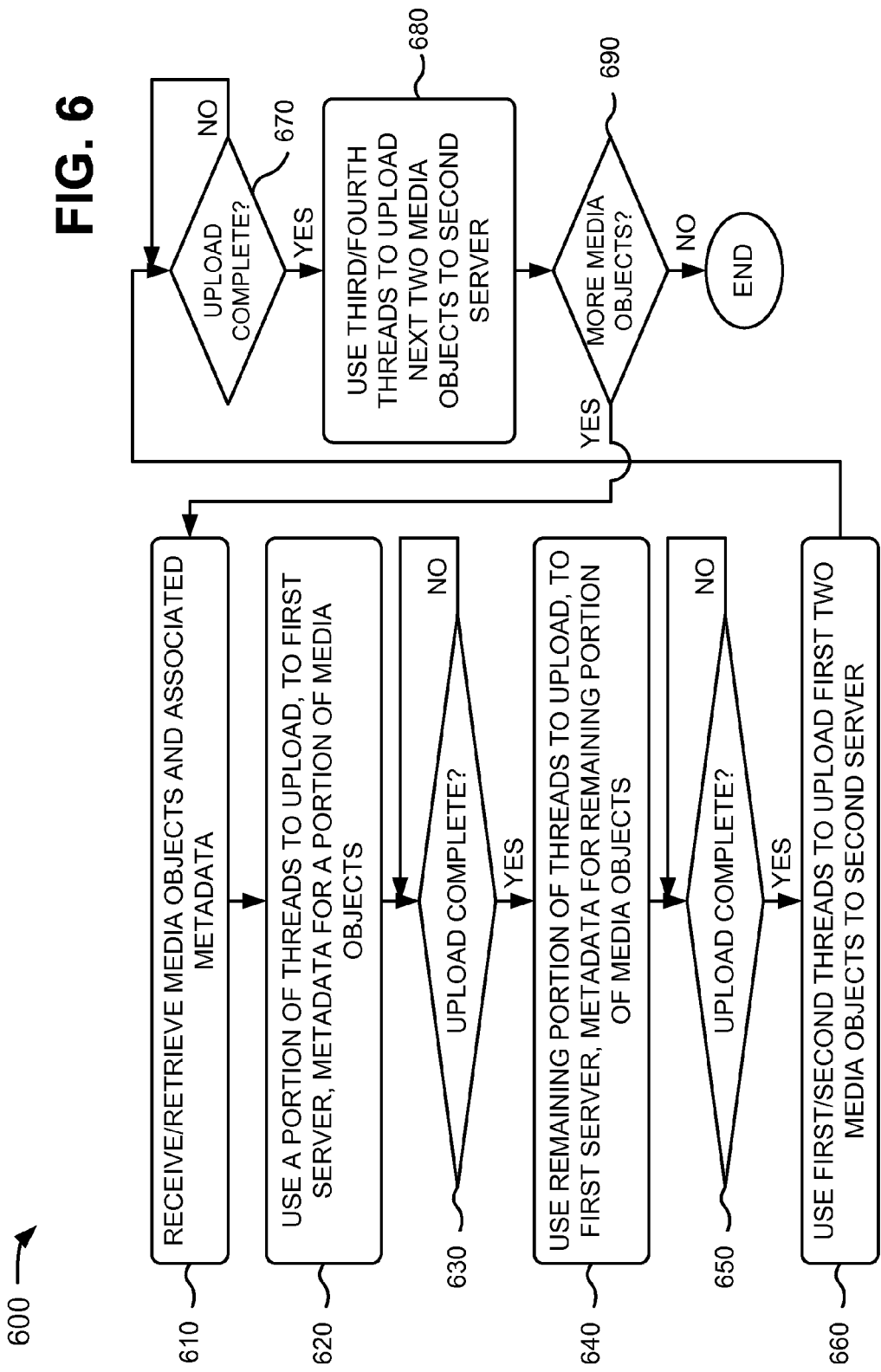

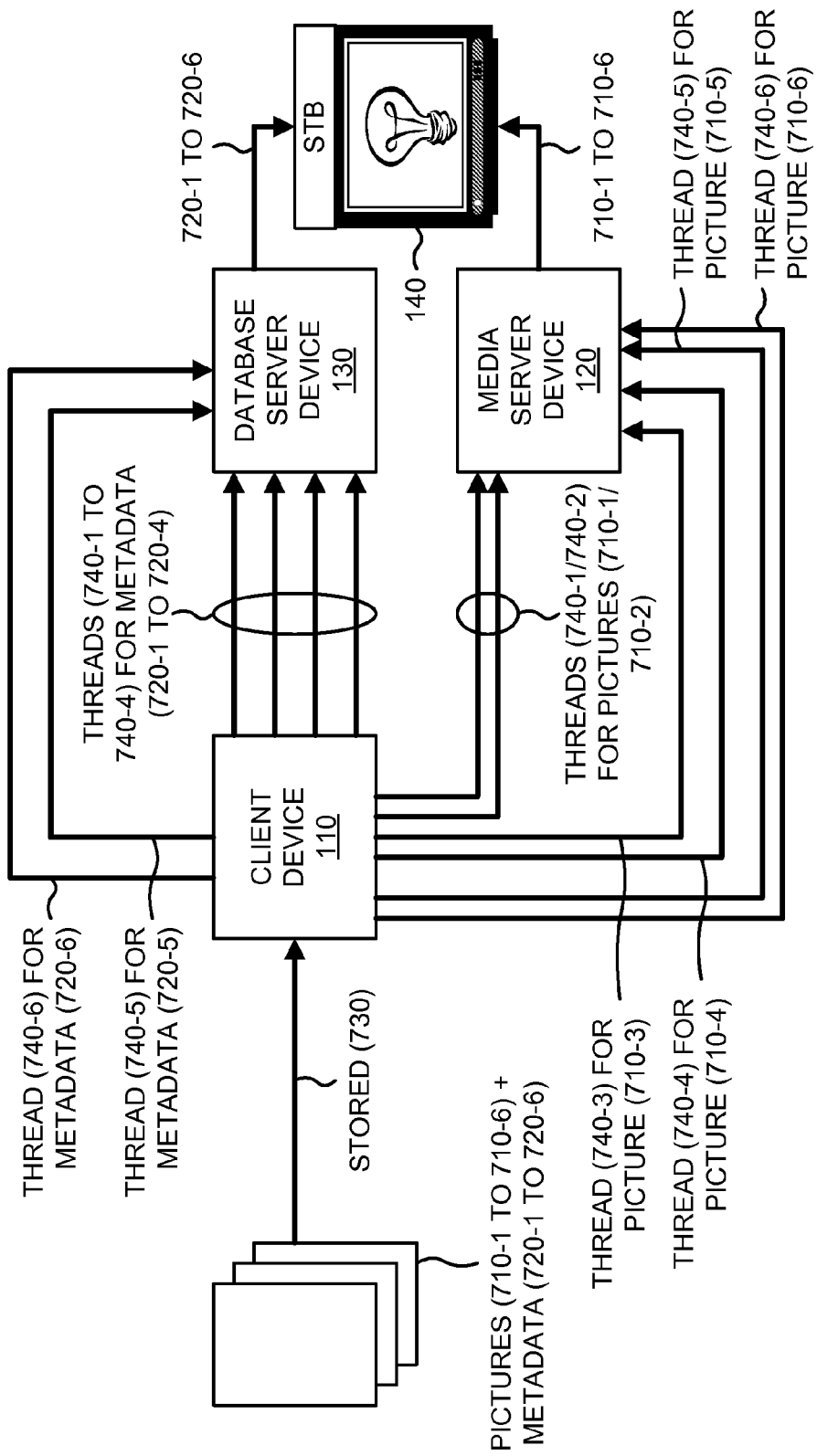

THREAD MECHANISM FOR MEDIA AND METADATA UPLOAD

BACKGROUND

Some client devices, such as a personal computer, may utilize a media manager application that enables a user to access media content that either resides on and/or is streamed from the client device. In one example, the media content may be accessed via a media sharing device, such as a set-top box (STB) and/or digital video recorder (DVR) connected to a television. Using the media manager application, the user can access digital photos, music files, Internet radio stations, home videos, Internet videos, etc. from the media sharing device.

In order to share the media content, the media manager application on the client device may upload the media content to a media server, and the media server may provide the uploaded media content to the media sharing device. Before uploading the media content to the media server, the media manager application first needs to create a record for the media content in a database server. The media manager application populates the record in the database server with metadata associated with the media content. The media manager application may utilize one or two threads to upload the media content and the associated metadata. However, since the media content and metadata need to be uploaded to separate servers, the one or two threads are initially utilized to create a record in the database server, and then are utilized to upload the media content. Such an arrangement may provide slow uploading of media content since the one or two threads spend an inordinate amount of time creating the record in the database server.

BRIEF DESCRIPTION OF THE DRAWINGS

FIG. 1 is a diagram of an example network in which systems and/or methods described herein may be implemented;

FIG. 2 is a diagram of example components of one or more of the devices of the network depicted in FIG. 1;

FIG. 3 is a diagram of example interactions between components of an example portion of the network depicted in FIG. 1;

FIG. 4 is a diagram of example functional components of a client device of the network illustrated in FIG. 1;

FIGS. 5A and 5B are diagrams of example interactions between components of another example portion of the network depicted in FIG. 1;

FIG. 6 is a flow chart of an example process for uploading media content and associated metadata according to an implementation described herein; and FIG. 7 is a diagram of example media content that may be uploaded by the client device.

DETAILED DESCRIPTION OF PREFERRED EMBODIMENTS

The following detailed description refers to the accompanying drawings. The same reference numbers in different drawings may identify the same or similar elements.

Systems and/or methods described herein may provide a thread synchronization mechanism in a client device that uploads media content to a media server and uploads metadata associated with the media content to a database server. The thread synchronization mechanism may improve media content and metadata uploading by the client device to the media server and the database server, respectively.

In one example implementation, the thread synchronization mechanism may receive and/or retrieve (e.g., from storage) media objects and associated metadata, may use a first portion of threads to upload metadata for a portion of the media objects to a database server, and may determine whether the upload is complete. If the upload is not complete, the thread synchronization mechanism may wait until the upload is complete. If the upload is complete, the thread synchronization mechanism may use the remaining portion of the threads to upload metadata for the remaining portion of the media objects to the database server. If the upload is not complete, the thread synchronization mechanism may wait until the upload is complete. If the upload is complete, the thread mechanism may use the first and second threads to upload the first two media objects to a media server, and may determine whether the upload is complete. If the upload is not complete, the thread synchronization mechanism may wait until the upload is complete. If the upload is complete, the thread synchronization mechanism may use the third and fourth threads to upload the next two media objects to the media server. The thread synchronization mechanism may determine whether there are additional media objects to upload, and may use the fifth and sixth threads to upload metadata for two media objects, of the additional media objects, to the database server when there are additional media objects to upload. The thread synchronization mechanism may repeat the process until all of the media objects are uploaded.

As used herein, the term "user" is intended to be broadly interpreted to include a client device, or a user of a client device.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

FIG. 1 is a diagram of an example network 100 in which systems and/or methods described herein may be implemented. As illustrated, network 100 may include a client device 110, a media server device 120, a database server device 130, and a media sharing device 140 interconnected by a network 150. Components of network 100 may interconnect via wired and/or wireless connections. A single client device 110, media server device 120, database server device 130, media sharing device 140, and network 150 have been illustrated in FIG. 1 for simplicity. In practice, there may be more client devices 110, media server devices 120, database server devices 130, media sharing devices 140, and/or networks 150.

Client device 110 may include any device that is capable of communicating with media server device 120 and database server device 130 via network 150. For example, client device 110 may include a mobile computation and/or communication device, such as a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a global positioning system (GPS) device, a content recording device (e.g., a camera, a video camera, etc.), etc. Alternatively, or additionally, client device 110 may include a fixed (e.g., provided in a particular location, such as within a user's home) computation and/or communication device, such as a personal computer, a workstation computer, a gaming system, etc.

In one example implementation, client device 110 may include a media manager application that that enables a user to access media content that either resides on and/or is streamed from client device 110. In one example, the media content may be accessed via media sharing device 140. In order to share the media content with media sharing device 140, the media manager application on client device 110 may upload the media content to media server device 120, and media server device 120 may provide the uploaded media content to media sharing device 150. Further details of client device 110 are provided below in connection with, for example, one or more of FIGS. 2-7.

Media server device 120 may include one or more server devices, or other types of computation or communication devices, that gather, process, and/or provide information in a manner described herein. For example, media server device 120 may include a server device that communicates with client device 110 (e.g., via network 150) and enables client device 110 to upload media content for storage. The terms "media content," "media," and "media object" may be used interchangeably herein. The media content may include multiple media objects, such as, for example, digital photos, music files, Internet radio stations, home videos, Internet videos, multimedia content, audio content, video content, audio and video content, etc. Media server device 120 may receive the media content from client device 110, and may store the media content in a database or some other type of data structure associated with media server device 120. Media server device 120 may enable a user of client device 110 to access the media content via one or more media sharing devices, such as media sharing device 140.

Database server device 130 may include one or more server devices, or other types of computation or communication devices, that gather, process, and/or provide information in a manner described herein. For example, database server device 130 may include a server device that communicates with client device 110 (e.g., via network 150) and enables client device 110 to upload metadata, associated with media content stored in media server device 120, as a record(s) in database server device 130. The metadata may include data providing information about one or more aspects of the media content stored in media server device 120, such as, for example: means for creating the media content; purpose of the media content; time and date of creation of the media content; creator or author of the media content; information associated with where the media content is stored; etc. For example, if the metadata is associated with a digital photo, the metadata may include information, such as an identity of the owner of the digital photo, copyright contact information associated with the digital photo, keywords associated with the digital photo, etc. Database server device 130 may receive the metadata from client device 110, and may store the metadata in a database or some other type of data structure associated with database server device 130. Database server device 130 may enable a user of client device 110 to access the metadata via one or more media sharing devices, such as media sharing device 140.

Media sharing device 140 may include any device that is capable of communicating with media server device 120 and database server device 130 via network 150. For example, media sharing device 140 may include a device, such as a STB, a DVR, a television, and/or a combination of a STB, a DVR, and/or a television. In one example implementation, media sharing device 140 may enable a user to access media content that either resides on or is streamed from client device 110.

Network 150 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks.

In one example implementation, client device 110 may include a thread synchronization mechanism that enables client device 110 to efficiently upload media content and associated metadata to media server device 120 and database server device 130, respectively. Client device 110 may receive and/or retrieve (e.g., from storage) media objects and associated metadata, may use four threads to upload metadata for a portion of the media objects to database server device 130, and may determine whether the upload is complete. If the upload is not complete, client device 110 may wait until the upload is complete. If the upload is complete, client device 110 may use the remaining portion of the threads to upload metadata for a remaining portion of the media objects to database server device 130, and may determine whether the upload is complete. If the upload is not complete, client device 110 may wait until the upload is complete. If the upload is complete, client device 110 may use the first and second threads to upload the first two media objects to media server device 120, and may determine whether the upload is complete. If the upload is not complete, client device 110 may wait until the upload is complete. If the upload is complete, client device 110 may use the third and fourth threads to upload the next two media objects to media server device 120. Client device 110 may determine whether there are additional media objects to upload, and may use the fifth and sixth threads to upload metadata for two media objects, of the additional media objects, to database server device 130 when there are additional media objects to upload. Client device 110 may repeat the process until all of the media objects are uploaded (i.e., when there are no additional media objects to upload).

Although FIG. 1 shows example components of network 100, in other implementations, network 100 may include fewer components, different components, differently arranged components, and/or additional components than those depicted in FIG. 1. Alternatively, or additionally, one or more components of network 100 may perform one or more other tasks described as being performed by one or more other components of network 100.

FIG. 2 is a diagram of example components of a device 200 that may correspond to one of the devices of network 100. In one example implementation, one or more of the devices of network 100 may include one or more devices 200. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more ASICs, FPGAs, or the like.

Memory 230 may include a RAM or another type of dynamic storage device that stores information and instructions for execution by processing unit 220, a ROM or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 360 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

FIG. 3 is a diagram of example interactions between components of an example portion 300 of network 100 (FIG. 1). As illustrated, example network portion 300 may include client device 110, media server device 120, database server device 130, and media sharing device 140. Client device 110, media server device 120, database server device 130, and media sharing device 140 may include the features described above in connection with, for example, one or more of FIGS. 1 and 2.

In order to share media content contained in client device 110 with media sharing device 140, client device 110 may upload the media content to media server device 120, and media server device 120 may provide the uploaded media content to media sharing device 140. Before uploading the media content to media server device 120, client device 110 first may create a record for the media content in database server device 130. As shown in FIG. 3, client device 110 may populate records in database server device 130 with metadata 310 associated with the media content. For example, client device 110 may provide metadata 310 to database server device 130, and database server device 130 may utilize metadata 310 to create a record(s) in a database or some other type of data structure associated with database server device 130. Metadata 310 may include data providing information about one or more aspects of the media content to be stored in media server device 120, such as, for example: means for creating the media content; purpose of the media content; time and date of creation of the media content; creator or author of the media content; information associated with where the media content is stored; etc.

As further shown in FIG. 3, after creating a record(s) in database server device 130 with metadata 310, client device 110 may provide media content 320, associated with metadata 310, to media server device 120. Media content 320 may include multiple media objects, such as, for example, digital photos, music files, Internet radio stations, home videos, Internet videos, multimedia content, audio content, video content, audio and video content, etc. Media server device 120 may receive media content 320, and may store media content 320 in a database or some other type of data structure associated with media server device 120. In prior arrangements, client device 110 may utilize one or two threads to upload media content 320 to media server device 120 and the associated metadata 310 to database server device 130. However, since metadata 310 and media content 320 need to be uploaded to separate servers, client device 110 may initially utilize the one or two threads to create the record in database server device 310 from metadata 310, and may then utilize the one or two threads to upload media content 320 to media server device 120. Such arrangements may provide slow uploading of media content 320 since the one or two threads can spend an inordinate amount of time creating the record in the database server device 130.

In order to address this, client device 110 may implement a thread synchronization mechanism as described below in connection with, for example, FIGS. 4-5B. As further shown in FIG. 3, media content 320 and its associated metadata 310 may be provided from media server device 120 and database server device 130, respectively, to media sharing device 140. Media sharing device 140 may receive media content 320, and may output media content 320 to a user of media sharing device 140. For example, if media content 320 is a home video and media sharing device 140 is a television, the home video may be displayed on the television.

Although FIG. 3 shows example components of network portion 300, in other implementations, network portion 300 may include fewer components, different components, differently arranged components, and/or additional components than depicted in FIG. 3. Alternatively, or additionally, one or more components of network portion 300 may perform one or more other tasks described as being performed by one or more other components of network portion 300.

FIG. 4 is a diagram of example functional components of client device 110. In one implementation, the functions described in connection with FIG. 4 may be performed by one or more components of device 200 (FIG. 2) or by one or more devices 200. As shown in FIG. 4, client device 110 may include media storage 400 and a thread synchronization mechanism 410 that includes a database semaphore 420 and a media semaphore 430.

Media storage 400 may receive media objects and associated metadata from a variety of sources. For example, client device 110 may create the media objects and metadata (e.g., a video may be recorded with client device 110) and may provide the media objects and metadata to media storage 400. Alternatively, or additionally, client device 110 may receive the media objects and metadata from an outside source, such as the Internet, a video camera, a digital camera, etc. Media storage 400 may receive the media objects and metadata, and may store the media objects and metadata. For purposes of explanation, in one example, media storage 400 may store a first media object/metadata pair 440-1 and a second media object/metadata pair 440-2.

Thread synchronization mechanism 410 may implement a number of threads (e.g., six threads) for uploading media and metadata to media server device 120 and database server device 130, respectively. Thread synchronization mechanism 410 may include database semaphore 420 and media semaphore 430. A semaphore may include a variable or abstract data type that provides a useful abstraction for controlling access by multiple processes to a common resource. Each of database semaphore 420 and media semaphore 430 may allow up to a particular number of threads (e.g., six threads). Database semaphore 420 may control uploading of metadata (e.g., for record creation) to database server device 130. Media semaphore 430 may control uploading of media objects to media server device 120.

In one example, if thread synchronization mechanism 410 receives more than four media objects, and associated metadata, for uploading, thread synchronization mechanism 410 may associate four threads with database semaphore 420. Database semaphore 420 may utilize the four threads to upload metadata (e.g., for four media objects) to database server device 130. When the metadata is uploaded to database server device 130, thread synchronization mechanism 410 may associate the four threads with media semaphore 430. Database semaphore 420 may utilize a remaining two threads to upload metadata (e.g., for two additional media objects) to database server device 130. Media semaphore 420 may utilize two of the four threads to upload two of the four media objects to media server device 120, and may utilize the other two of the four threads to upload the other two of the four media objects to media server device 120. Media semaphore 130 may utilize the remaining two threads to upload the two additional media objects to media server device 120. When the media objects are uploaded to the media server device 120, thread synchronization mechanism 410 may associate two threads, of the six threads, with database semaphore 420 for uploading the next two pieces of metadata to database server device 130. Thread synchronization mechanism 410 may repeat this process until all of the media objects and metadata are uploaded.

As shown in FIG. 4, thread synchronization mechanism 410 may receive, from media storage 400, two media objects and two associated metadata via first media object/metadata pair 440-1 and second media object/metadata pair 440-2. In such a situation, thread synchronization mechanism 410 may associate two threads 450-1 and 450-2 with database semaphore 420. Database semaphore 420 may utilize threads 450-1 and 450-2 to upload the metadata to database server device 130. When the metadata is uploaded to database server device 130, thread synchronization mechanism 410 may associate two other threads 450-3 and 450-4 with media semaphore 430. Media semaphore 420 may utilize threads 450-3 and 450-4 to upload the two media objects to media server device 120.

In one example implementation, thread synchronization mechanism 410 may receive and/or retrieve (e.g., from media storage 400) media objects and associated metadata, may use four threads (e.g., threads 450-1, 450-2, 450-3, and 450-4) to upload metadata for a portion of the media objects to database server device 130, and may determine whether the upload is complete. If the upload is not complete, thread synchronization mechanism 410 may wait until the upload is complete. If the upload is complete, thread synchronization mechanism 410 may use the remaining portion of the threads to upload metadata for the remaining portion of the media objects to database server device 130, and may determine whether the upload is complete. If the upload is not complete, thread synchronization mechanism 410 may wait until the upload is complete. If the upload is complete, thread synchronization mechanism 410 may use the first and second threads to upload the first two media objects to media server device 120, and may determine whether the upload is complete. If the upload is not complete, thread synchronization mechanism 410 may wait until the upload is complete. If the upload is complete, thread synchronization mechanism 410 may use the third and fourth threads to upload the next two media objects to media server device 120. Thread synchronization mechanism 410 may determine whether there are more media objects to upload, and may repeat the process until all of the media objects are uploaded.

Although FIG. 4 shows example functional components of client device 110, in other implementations, client device 110 may include different functional components, differently arranged functional components, or additional functional components than depicted in FIG. 4. Alternatively, or additionally, one or more functional components of client device 110 may perform one or more other tasks described as being performed by one or more other functional components of client device 110.

FIGS. 5A and 5B are diagrams of example interactions between components of another example portion 500 of the network 100 (FIG. 1). As illustrated, example network portion 500 may include database semaphore 420, media semaphore 430, media server device 120, and database server device 130. Database semaphore 420, media semaphore 430, media server device 120, and database server device 130 may include the features described above in connection with, for example, one or more of FIGS. 1-4.

In one example, example network portion 500 may upload media objects and associated metadata to media server device 120 and database server device 130, respectively. The media objects may include, for example, digital photos, music files, Internet radio stations, home videos, Internet videos, multimedia content, audio content, video content, audio and video content, etc. The metadata may include data providing information about one or more aspects of the media objects, such as, for example, times and dates of creation of the media objects, creators of the media objects, etc.

As shown in FIG. 5A, at an initial time period (Time 0), there may be six threads (T1-T6) ready to upload media files (e.g., the media objects and the associated metadata). The six threads (T1-T6) may be associated with database semaphore 420. At a first time period (Time 1), after the initial time period (Time 0), database semaphore 420 may allow four threads (e.g., T1-T4) to upload metadata to database server device 130. At a second time period (Time 2), after the first time period (Time 1), the four threads (T1-T4) may finish uploading the metadata to database server device 130 and may be ready to upload the media objects via media semaphore 430. Also at the second time period (Time 2), database semaphore 420 may allow two threads (T5 and T6) to upload metadata to database server device 130.

As shown in FIG. 5B, at a third time period (Time 3), after the second time period (Time 2), media semaphore 430 may allow two threads (T1 and T2) to upload media objects to media server device 120. Also at the third time period (Time 3), the two threads (T5 and T6) may finish uploading the metadata to database server device 130 and may be ready to upload media objects via media semaphore 430. At a fourth time period (Time 4), after the third time period (Time 3), threads (T1 and T2) may finish uploading the media to media server device 120 and may return to database semaphore 420 to obtain a new set of media files to upload. Also at the fourth time period (Time 4), media semaphore 430 may allow threads (T3 and T4) to upload media to media server device 120. This process may be repeated until all of the media objects and the metadata are uploaded to media server device 120 and database server device 130, respectively. In one example implementation, threads (T1-T6) may be independent of each other and may finish operations at different times. Alternatively, or additionally, client device 110 may include, at any time, at least two threads that are ready to upload media to media server device 120 via media semaphore 430.

Although FIGS. 5A and 5B show example components of network portion 500, in other implementations, network portion 500 may include fewer components, different components, differently arranged components, and/or additional components than depicted in FIGS. 5A and 5B. Alternatively, or additionally, one or more components of network portion 500 may perform one or more other tasks described as being performed by one or more other components of network portion 500. For example, although FIGS. 5A and 5B depict sequential use of threads (T1-T6), in one example implementation, threads (T1-T6) may be utilized by database semaphore 420 and/or media semaphore 430 as threads (T1-T6) become available.

FIG. 6 is a flow chart of an example process 600 for uploading media content and associated metadata according to an implementation described herein. In one implementation, process 600 may be performed by client device 110. Alternatively, or additionally, some or all of process 600 may be performed by another device or group of devices, including or excluding client device 110.

As shown in FIG. 6, process 600 may include receiving or retrieving media objects and associated metadata (block 610), and using a portion of threads to upload, to a first server, metadata for a portion of the media objects (block 620). For example, in an implementation described above in connection with FIG. 1, client device 110 may include a thread synchronization mechanism that enables client device 110 to efficiently upload media content and associated metadata to media server device 120 and database server device 130, respectively. Client device 110 may receive and/or retrieve (e.g., from storage) media objects and associated metadata, may use four threads to upload metadata for a portion of the media objects to database server device 130.

As further shown in FIG. 6, process 600 may include determining whether the upload of the metadata for the portion of the media objects is complete (block 630). If the upload is not complete (block 630—NO), process 600 may repeat process block 630. If the upload is complete (block 630—YES), process 600 may include using a remaining portion of the threads to upload metadata for a remaining portion of the media objects to the first server (block 640) and determining whether the upload of the metadata for the remaining portion of the media objects is complete (block 650). For example, in an implementation described above in connection with FIG. 1, client device 110 may determine whether the upload of the metadata for a portion of the media objects to database server device 130 is complete. If the upload is not complete, client device 110 may wait until the upload is complete. If the upload is complete, client device 110 may use the remaining portion of the threads to upload metadata for a remaining portion of the media objects to database server device 130, and may determine whether the upload is complete.

Returning to FIG. 6, if the upload is not complete (block 650—NO), process 600 may repeat process block 650. If the upload is complete (block 650—YES), process 600 may include using the first and second threads to upload a first two media objects to a second server (block 660) and determining whether the upload of the first two media objects is complete (block 670). For example, in an implementation described above in connection with FIG. 1, if the upload is not complete, client device 110 may wait until the upload is complete. If the upload is complete, client device 110 may use the first and second threads to upload the first two media objects to media server device 120, and may determine whether the upload is complete. If the upload is not complete, client device 110 may wait until the upload is complete.

As further shown in FIG. 6, if the upload is not complete (block 670—NO), process 600 may repeat process block 670. If the upload is complete (block 670—YES), process 600 may include using the third and fourth threads to upload a next two media objects to the second server (block 680) and determining whether there are more media objects to upload (block 690). If there are no more media objects to upload (block 690—NO), process 600 may end. If there are more media objects to upload (block 690—YES), process 600 may return to process block 610. For example, in an implementation described above in connection with FIG. 1, if the upload is complete, client device 110 may use the third and fourth threads to upload the next two media objects to media server device 120. Client device 110 may determine whether there are additional media objects to upload, and may use the fifth and sixth threads to upload metadata for two media objects, of the additional media objects, to database server device 130 when there are additional media objects to upload. Client device 110 may repeat the process until all of the media objects are uploaded (i.e., when there are no additional media objects to upload).

FIG. 7 is a diagram of example media content that may be uploaded by client device 110 to media server device 120 and database server device 130. Client device 110, media server device 120, and database server device 130 may include the features described above in connection with, for example, one or more of FIGS. 1-5.

As shown in FIG. 7, pictures 710-1 through 710-6 and associated metadata 720-1 through 720-6 may be stored in client device 110, as indicated by reference number 730. Pictures 710-1 through 710-6 may include, for example, digital photographs captured by client device 110. In one example, a user of client device 110 may want to view pictures 710-1 through 710-6 on media sharing device 140 (e.g., a STB/television combination).

In order to do this, client device 110 may utilize four threads 740-1 through 740-4 to provide metadata 720-1 through 720-4 to database server device 130. Database server device 130 may receive metadata 720-1 through 720-4, and may create records based on metadata 720-1 through 720-4. After metadata 720-1 through 720-4 is uploaded to database server device 130, client device 110 may utilize threads 740-5 and 740-6 to provide metadata 720-5 and 720-6 to database server device 130. Database server device 130 may receive metadata 720-5 and 720-6, and may create records based on metadata 720-5 and 720-6.

After metadata 720-5 and 720-6 is uploaded to database server device 130, client device 110 may utilize threads 740-1 and 740-2 to provide pictures 710-1 and 710-2 to media server device 120. Media server device 120 may receive and store pictures 710-1 and 710-2. After pictures 710-1 and 710-2 are uploaded to media server device 120, client device 110 may utilize threads 740-3 and 740-4 to provide pictures 710-3 and 710-4 to media server device 120. Media server device 120 may receive and store pictures 710-3 and 710-4. After pictures 710-3 and 710-4 are uploaded to media server device 120, client device 110 may utilize threads 740-5 and 740-6 to provide pictures 710-5 and 710-6 to media server device 120. Media server device 120 may receive and store pictures 710-5 and 710-6. One or more of pictures 710-1 through 710-6 may be provided from media server device 120 to the STB/television for viewing by the user. Database server device 130 may provide metadata 720-1 through 720-6 associated with pictures to be viewed by the STB/television.

Systems and/or methods described herein may provide a thread synchronization mechanism in a client device that uploads media content to a media server and uploads metadata associated with the media content to a database server. The thread synchronization mechanism may improve media content and metadata uploading by the client device to the media server and the database server, respectively.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 6, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a device, media objects and metadata associated with the media objects;
   using, by the device, a portion of threads to upload, to a first server, metadata for a portion of the received media objects;
   determining, by the device, whether the metadata for the portion of the media objects is uploaded;
   using, by the device and when the metadata for the portion of the media objects is uploaded, another portion of the threads to upload, to the first server, metadata for another portion of the media objects;
   determining, by the device, whether the metadata for the other portion of the media objects is uploaded;
   using, by the device, a first thread and a second thread to upload a first two media objects to a second server when the metadata for the other portion of the media objects is uploaded;
   determining, by the device, whether the first two media objects are uploaded; and
   using, by the device and when the first two media objects are uploaded, a third thread and a fourth thread to upload a next two media objects to the second server.

2. The method of claim 1, further comprising:
   determining whether there are additional media objects to upload to the second server; and
   using a fifth thread and a sixth thread to upload two of the additional media objects to the second server.

3. The method of claim 2, further comprising:
   using the first thread and the second thread to upload metadata for the additional media objects to the first server when the two of the additional media objects are uploaded to the second server.

4. The method of claim 1, where the device utilizes a first semaphore to upload the metadata to the first server.

5. The method of claim 4, where the device utilizes a second semaphore, separate from the first semaphore, to upload the media objects to the second server.

6. The method of claim 1, where the media objects include one or more of:
   digital photographs,
   music files,
   Internet radio station content,
   home videos,
   Internet videos,
   multimedia content,
   audio content,
   video content, and
   audio and video content.

7. The method of claim 1, where the metadata includes data providing information about one or more aspects of the media objects.

8. A device, comprising:
   a memory to store a plurality of instructions; and
   a processor to execute instructions in the memory to:
      receive media objects and metadata associated with the media objects,
      utilize a portion of threads to upload, to a first server, metadata for a portion of the received media objects,
      utilize, after the metadata for the portion of the media objects is uploaded, another portion of the threads to upload, to the first server, metadata for a remaining portion of the media objects,
      utilize a first thread and a second thread to upload a first two media objects to a second server after the metadata for the remaining portion of the media objects is uploaded, and
      utilize, after the first two media objects are uploaded, a third thread and a fourth thread to upload a next two media objects to the second server.

9. The device of claim 8, where the processor is further to:
   determine whether there are additional media objects to upload to the second server, and
   utilize a fifth thread and a sixth thread to upload two of the additional media objects to the second server.

10. The device of claim 9, where the processor is further to:
    utilize the first thread and the second thread to upload metadata for the additional media objects to the first server when the two of the additional media objects are uploaded to the second server.

11. The device of claim 8, where the processor is further to implement a first semaphore to upload the metadata to the first server.

12. The device of claim 11, where the processor is further to implement a second semaphore, separate from the first semaphore, to upload the media objects to the second server.

13. The device of claim 12, where the processor is further to implement a thread synchronization mechanism that includes the first semaphore and the second semaphore.

14. The device of claim 8, where each media object includes at least one of:
   a digital photograph,
   a music file,
   Internet radio station content,
   a home video,
   an Internet video,
   multimedia content,
   audio content,
   video content, or
   audio and video content.

15. The device of claim 8, where the metadata includes data providing information about one or more aspects of the media objects.

16. A non-transitory computer-readable medium, comprising:
   one or more instructions that, when executed by a processor, cause the processor to:
      retrieve media objects and metadata associated with the media objects,
      use a portion of threads to upload, to a first server, metadata for a portion of the received media objects,
      determine whether the metadata for the portion of the media objects is uploaded,
      use, when the metadata for the portion of the media objects is uploaded, a remaining portion of the threads to upload, to the first server, metadata for a remaining portion of the media objects,
      determine whether the metadata for the remaining portion of the media objects is uploaded,
      use a first thread and a second thread to upload a first two media objects to a second server when the metadata for the remaining portion of the media objects is uploaded,
      determine whether the first two media objects are uploaded, and
      use, when the first two media objects are uploaded, a third thread and a fourth thread to upload a next two media objects to the second server.

17. The non-transitory computer-readable medium of claim 16, further comprising:
   one or more instructions that, when executed by the processor, cause the processor to:
      determine whether there are additional media objects to upload to the second server, and
      use a fifth thread and a sixth thread to upload two of the additional media objects to the second server.

18. The non-transitory computer-readable medium of claim 17, further comprising:
   one or more instructions that, when executed by the processor, cause the processor to:
      use the first thread and the second thread to upload metadata for the additional media objects to the first server when the two of the additional media objects are uploaded to the second server.

19. The non-transitory computer-readable medium of claim 16, further comprising:
   a first semaphore to upload the metadata to the first server.

20. The non-transitory computer-readable medium of claim 16, further comprising:
   a second semaphore, separate from the first semaphore, to upload the media objects to the second server.

* * * * *